Dec. 1, 1959 F. L. HARDESTY 2,915,587
PORTABLE POWER MEGAPHONE APPARATUS
Filed Dec. 22, 1953 2 Sheets-Sheet 1
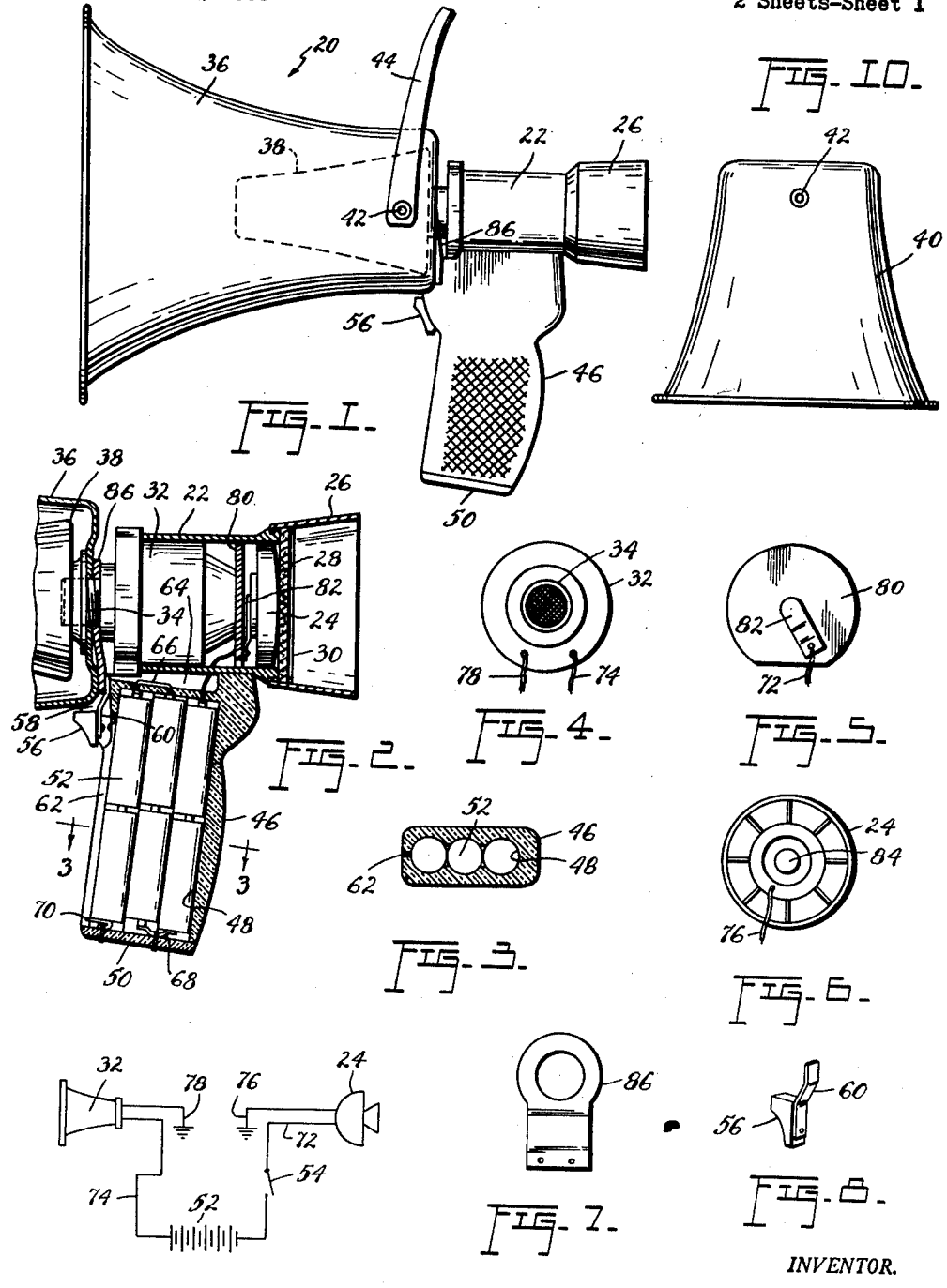
INVENTOR.
Frederick L. Hardesty Dec. 1, 1959   F. L. HARDESTY   2,915,587
PORTABLE POWER MEGAPHONE APPARATUS
Filed Dec. 22, 1953   2 Sheets-Sheet 2
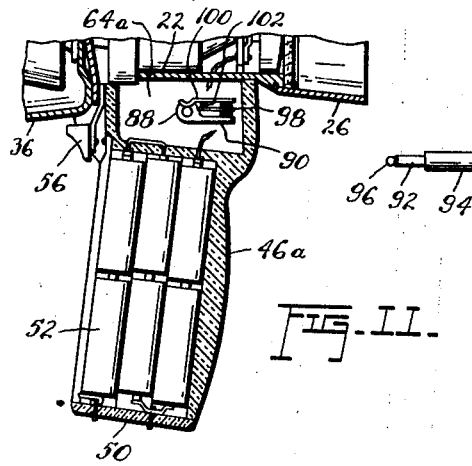
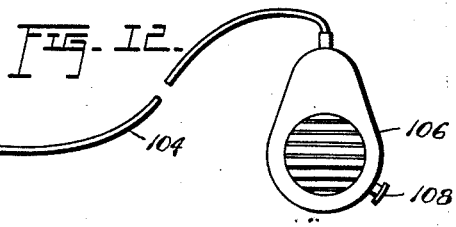
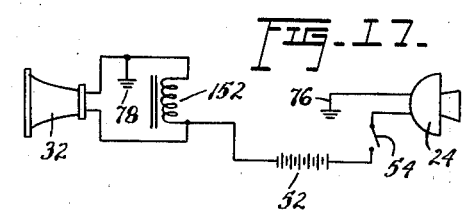
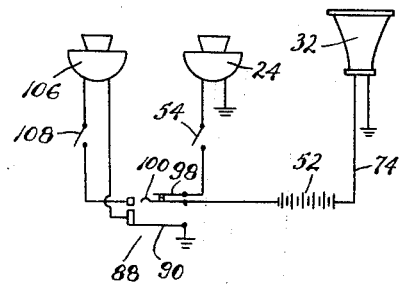
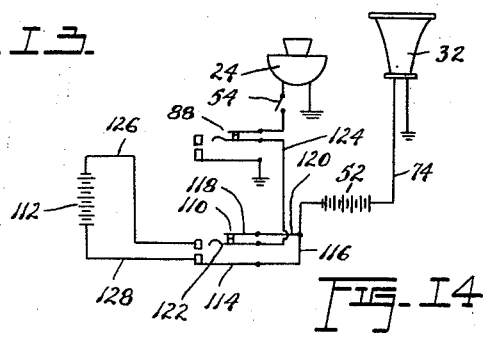
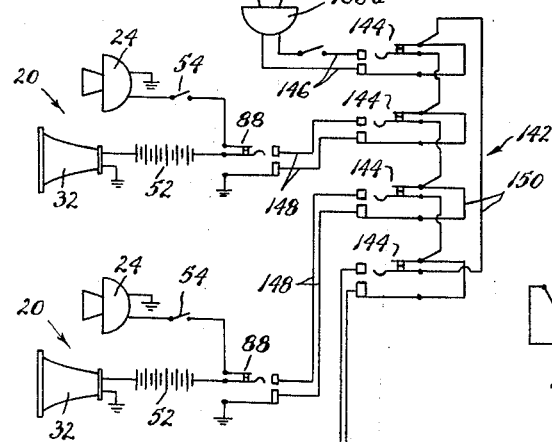
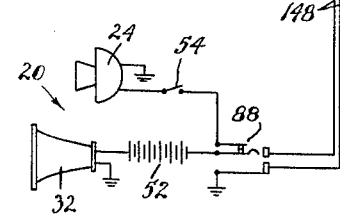
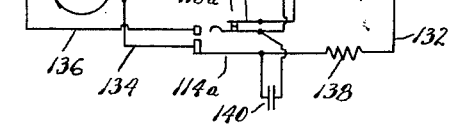
INVENTOR.
*Frederick L. Hardesty*

United States Patent Office 2,915,587
Patented Dec. 1, 1959

2,915,587

PORTABLE POWER MEGAPHONE APPARATUS

Frederick L. Hardesty, Silver Spring, Md.

Application December 22, 1953, Serial No. 399,665

2 Claims. (Cl. 179—1)

This invention relates to new and useful improvements and structural refinements in portable power megaphone apparatus, that is, megaphone apparatus of an electrically actuated type which may be conveniently moved from one site of operation to another.

More specifically, the invention concerns itself with an apparatus which includes a microphone, a horn with its customary driver unit, a battery and an electrical circuit which operatively connects the microphone and the driver unit with the battery, and the principal object of this invention is to combine these various components into an assembly which is compact in form, light in weight, efficient in operation and which, by virtue of these characteristics may be conveniently carried and manipulated as a unit with only one arm of the user.

Another object of the invention is to render such an assembly fully self-contained, in the sense that by including a battery in the unit, the same is completely independent of any outside source of electric current and, therefore, may be effectively employed in any desired location, particularly in places and under conditions where a similar unit, dependent upon an external power source, would be useless.

A further object of this invention is to embody the battery of the megaphone assembly into a handle by means of which the entire assembly may be conveniently carried, thereby conserving a substantial amount of space and correspondingly maintaining the size and shape or form of the assembly on a reasonable level, in conformity with the ease and convenience with which the assembly is intended to be carried and manipulated.

A still further object of the instant invention is to substantially broaden and enhance the versatility and utility of the megaphone assembly, this being achieved by the provision of means whereby the assembly may be readily furnished, when so desired, with an auxiliary or a substitute source of power from an external source; whereby an auxiliary microphone may be connected to the assembly and the assembly actuated from a remote point of control; or whereby a group of megaphone units may be operatively connected together and to a remotely disposed, external master microphone, so as to function in the manner of a public address system.

With the above more important objects and features in view, and such other objects and features as may become apparent as this specification proceeds, the invention resides in the details of construction and arrangement of parts as shown in the accompanying drawings, wherein corresponding reference numerals are employed to designate corresponding parts and wherein:

Figure 1 is a side elevational view of the megaphone assembly;

Figure 2 is a fragmentary sectional view thereof on an enlarged scale;

Figure 3 is a sectional detail, taken substantially in the plane of the line 3—3 in Figure 2;

Figure 4 is an elevational view of the driver unit used in the invention;

Figure 5 is an elevational view of a spacer used therein;

Figure 6 is an elevational view of the microphone;

Figure 7 is an elevational view of a yoke;

Figure 8 is a perspective view of a switch contact strip and actuator;

Figure 9 is a wiring diagram of the electrical components of the megaphone assembly;

Figure 10 is an elevational view of a modified form of the horn used in the invention;

Figure 11 is a fragmentary sectional detail, similar to that shown in Figure 3, but illustrating a modified form of the invention such as may be used with an external microphone or external power supply, or both;

Figure 12 is an elevational view showing an external microphone and its connecting means to the megaphone assembly;

Figure 13 is a wiring diagram of the megaphone assembly with an external microphone;

Figure 14 is a wiring diagram of the assembly with an auxiliary, external power source;

Figure 15 is a wiring diagram of the assembly with a substitute external power source;

Figure 16 is a wiring diagram utilizing a group of megaphone assemblies together with an external microphone in a public address system; and Figure 17 is a wiring diagram, similar to that shown in Figure 9, but illustrating a choke interposed into the circuit.

With reference now to the accompanying drawings in detail, in particular to Figures 1–9 inclusive, the portable power megaphone assembly is designated generally by the numeral 20 and embodies in its construction a substantially tubular housing 22 having a microphone 24 suitably mounted in the rear end portion thereof, as shown. A substantially frusto-conical mouth-piece 26 is also mounted at the rear end of the housing 22 and a sound absorbing pad 28 of suitable thickness is positioned in the mouth-piece 26 against the microphone 24 to eliminate feed back. The pad 28 may be removably sustained in place by a keeper ring 30.

A driver unit 32 is mounted in any suitable manner in the front end portion of the housing 22 and includes a forwardly projecting adapter 34 carrying an expotential horn 36. The latter is provided with the usual reentrant cone 38 which is screw-threaded on the adapter 34 and thereby sustains the entire horn in place. However, by simply unscrewing the cone 38 from the adapter 34, the horn 36 may be readily removed and substituted, for example, by another horn of a different configuration or size, as illustrated at 40 in Figure 10. In any event, the horns 36, 40 are provided at diametrically opposed points thereon with fastener elements 42 of any conventional type, to which the ends of a strap 44 may be separably attached so that the entire device may be conveniently suspended and carried over a user's shoulder, when not in actual use.

A pistol-type handle 46 is suitably secured to and depends from the housing 22, the handle 46 being hollow and affording therein a battery compartment 48 which is open, for purposes of access, at the lower end of the handle. However, the handle is provided at its lower end with a removable cap 50 which constitutes a closure for the compartment 48. The compartment 48 may be formed by simply providing the handle with a plurality of parallel, contiguous bores, whereby to receive a plurality of cells of a dry cell battery 52. It may be stated at this point that although, of course, the device may be adapted for operation at any suitable voltage, the microphone 24 and the driver unit 32 are preferably coordinated to function satisfactorily with a power supply ranging from 9 to 18 volts. Under such circumstances, the compartment 48 is arranged to accommodate three groups of two dry cells having the customary voltage of 1½ volts each, so that when the dry cells are connected in series, a power supply of 9 volts is available.

A normally open switch 54 is also carried by the handle 46 at a point adjacent the housing 22 and in the front edge portion of the handle. This switch includes a depressible, trigger-type actuator 56 which is disposed in a suitable recess 58 formed in the handle and has secured thereto a resilient contact strip 60. The contact strip 60 is electrically engageable, upon depression of the actuator 56, with the upper end portion of an elongated conductor 62 which is suitably embedded in the front edge portion of the handle 46 and extends downwardly to the cap 50.

It will be also noted that the upper end portion of the handle 46 is recessed as indicated at 64 to accommodate various electrical connections between the several components of the device, such as for example, a conductor 66 which bridges together at the upper end of the compartment 48 two groups of dry cells of the battery 52.

The dry cells of the battery 52 are connected at the lower end of the compartment 48 by suitable metallic clips 68, 70, which are secured to the cap 50 and close the circuit through the battery when the cap is in place. One of these clips, namely, the clip 70, also engages the aforementioned conductor 62, thereby connecting the battery in series with the switch 54.

The switch 54, in turn, is connected in series by a wire conductor 72 with the microphone 24, while another wire conductor 74 connects the battery in series with the driver unit 32. Both the microphone and the driver unit are suitably grounded as indicated at 76, 78, respectively, in Figure 9.

With reference again to the accompanying Figure 2, it will be observed that a disc-shaped spacer 80 of insulating material is interposed between and in abutment with the microphone 24 and the driver unit 32 inside the housing 22, the spacer 80 being provided with a resilient contact strip 82 which engages the usual center contact member 84 of the microphone 24 and has connected thereto the conductor 72 from the battery 52. With reference to the same Figure 2 of the drawings, it will be also noted that a yoke 86, shown per se in Figure 7, is suitably secured to the front upper edge portion of the handle 46 and supportably engages the adapter 34 of the driver unit 32, whereby to assist in holding the entire device together. The free upper end portion of the aforementioned switch contact strip 60 is interposed and secured between the yoke 86 and the handle 46, in which manner the switch actuator 56 is sustained in position in the recess 58.

It will be apparent from the foregoing that when the actuator 56 of the switch 54 is depressed, the circuit through the microphone, the driver unit, the switch and the battery will be closed, thus placing the device in readiness for operation.

With reference now to the modified embodiment of the invention shown in Figures 11, 12 and 13, the recess 64a at the upper end of the handle 46a is suitably enlarged, so as to accommodate one or more selector jacks 88. Each of these jacks, being of a conventional type, may include a combined ground and supporting member 90 engageable by a shank 92 of a conventional coupling or connecting plug 94 which also includes a contact head 96 insulated from the shank 92. A pair of contact strips 98, 100, insulated from each other and from the member 90, are mounted on and carried by the member 90 and are equipped with normally closed contact points 102 which are separated when the plug 94 is engaged with the jack so that the head 96 of the plug engages the strip 100. In so doing, the shank 92 of the plug also engages the ground member 90, as will be readily understood.

Accordingly, the jack 88 may be interposed into the circuit of the megaphone assembly by installing the same, for example, in the recess 64a, connecting the strip 98 in series with the switch 54, connecting the strip 100 with the battery 52, and connecting the member 90 with the ground, as illustrated in Figure 13. The shank and the head of the plug 94 are connected by a suitable flexible conductor 104 with a secondary microphone 106, equipped with a built-in switch 108, the microphone 106 being disposed externally and remotely from the megaphone assembly 20. Thus, by simply engaging the plug 94 with the selector jack 88, the external microphone 106 may be interposed into the megaphone circuit while simultaneously excluding the internal or primary microphone 24 and its associated switch 54. In this manner, the megaphone assembly may be operated from a remote point as far as the microphone is concerned, while still utilizing the self-contained source of power in the form of the battery 52.

With reference now to the further modified embodiment of the invention shown in the accompanying Figure 14, this utilizes two selector jacks 88, 110 which are similar in construction and operation. The jack 88 may be employed, when desired, for use in conjunction with an external microphone as already described, while the jack 110 is intended for use in conjunction with an external source of power, either auxiliary to or in substitution for the battery 52.

In the embodiment shown in Figure 14, the external source of power assumes the form of a dry battery 112 which is disposed exteriorly of and remotely from the megaphone assembly 20 as illustrated, and may have the power equivalent, for example, to 9 volts. The "ground" member 114 of the jack 110, in this instance is insulated and is connected to the battery 52 by a conductor 116, which also communicates with the contact strip 118 of the jack through the medium of a conductor 120. The second contact strip 122 of the jack is connected by a conductor 124 with the jack 88. A conductor 126 from the external battery 112 is engageable with the contact strip 122, while the second conductor 128 from the battery is engageable with the jack member 114. Accordingly, when the external battery 112 is connected to the jack 110, it will be connected in series with the battery 52, so that a circuit having a potential difference of 18 volts will be established and, with the resistance through the microphone and driver unit remaining constant, the apparatus will operate at substantially twice the current strength of the built-in battery 52 alone.

With reference now to the accompanying Figure 15, the same shows an alternate arrangement employing an external source of power, however, in this instance, in exclusion of the built-in battery 52. This arrangement may be used when a power source, such as for example, the generator of an automotive vehicle is available, as indicated at 130. In this instance, the "ground" member 114a of the jack 110a is connected by a conductor 132 with the conductor 74, while the strip 118 of the jack is connected with the battery 52. The second strip 122 of the jack 110a is connected with the jack 88. One wire 134 from the generator 130 is connectable with the member 114a which, of course, is insulated, while the other wire 136 from the generator is connectable with the jack strip 122. Accordingly, when the external source of power 130 is connected to the jack 110a, the internal source 52 (battery) will be automatically excluded from the circuit and the megaphone assembly will be operated by the external source of power alone.

Inasmuch as the external source of power usually has a rating of approximately 24 volts, a suitable resistor 138 is interposed in series into the conductor 132, whereby to reduce the potential difference to 18 volts, in accordance with the suggested rating of the microphone and driver unit circuit. Also, a suitable condenser 140 may be interposed in parallel into the circuit, so as to prevent any interference of the generator with the microphone and driver unit.

Finally, with reference to the accompanying Figure 16 which shows a further modified embodiment of the invention in the nature of a public address system, several megaphone assemblies 20 are used in conjunction with an external, remote microphone 106a and a junction box indicated diagrammatically at 142. The junction box 142 contains a plurality of selector jacks 144, similar to the jacks 88, 110, and one of these jacks is connected to the microphone 106a as indicated at 146. The remaining jacks in the junction box may be connected, selectively and individually with the jacks 88 of the respective megaphone assemblies 20 as indicated at 148, and the jacks 144 themselves in the junction box 142 are connected together in series, as exemplified at 150.

Accordingly, by simply connecting any desired number of the megaphone assemblies 20 to the junction box 142, the same may be operated in response to energization of the external "master" microphone 106a and in exclusion of the built-in microphones 24 of the respective assemblies, so as to function as an effective public address system.

By a similar token, a plurality of external microphones may be used in this system in conjunction with one or more megaphone assemblies, if so desired, to facilitate announcements from two or more different points on the scene where the apparatus is used, as will be clearly apparent.

With reference to the accompanying Figure 17, the same shows a simple basic circuit similar to that illustrated in Figure 9, with the exception that a choke 152 is interposed into the circuit by being connected in parallel with the driver unit 32. This choke serves to reduce the direct current impedance and greatly increase the alternating current impedance through the driver unit, so that the power of the driver unit is considerably increased and the audio volume of the megaphone assembly is proportionately enlarged.

It is to be understood that the circuit shown in Figure 17 is for illustrative purposes only and that the choke 152 may be also embodied in any of the other circuits disclosed herein. It will be also understood that the choke may be provided with one or more taps intermediate the ends of its winding, so that only a portion of the choke winding may be energized in accordance with the impedance requirements of the remainder of the circuit, while the inductance of the core of the choke remains substantially constant.

Although in the foregoing there have been described and shown various embodiments of the instant invention, further modifications may become apparent to those skilled in the art to which the invention relates. Accordingly, it is not desired to limit the spirit and scope of this invention to the disclosure herein, it being understood that other modifications and adaptations may be resorted to, such as may lie within the scope of the appended claims.

What is claimed as new is:

1. In a portable power megaphone apparatus, the combination of a portable body, a megaphone assembly including a microphone and a driver unit carried by said body, a first battery carried by said body, an electrical circuit operatively connecting said microphone and said driver unit in series with said first battery, a selector jack carried by the body and connected in series with the first battery, a second battery disposed exteriorly of and remotely from said body, and conductor means electrically engageable with said jack and connected to said second battery, whereby said microphone and said driver unit may be operated selectively by the combined voltage of the first and second batteries and by the relatively smaller voltage of the first battery in exclusion of the second battery.

2. In a portable power megaphone apparatus, the combination of a portable body, a megaphone assembly including a primary microphone and a driver unit carried by said body, a first battery carried by said body, an electrical circuit operatively connecting said primary microphone and said driver unit in series with said first battery, a first selector jack carried by the body and connected in series with the first battery, a second battery disposed exteriorly of and remotely from said body, conductor means electrically engageable with said first jack and connected to said second battery whereby said microphone and said driver unit may be operated selectively by the combined voltage of the first and second batteries and by the relatively smaller voltage of the first battery in exclusion of the second battery, a second selector jack carried by said body and connected in parallel with said primary microphone, a secondary microphone disposed exteriorly of and remotely from said body; and second conductor means electrically engageable with said second jack and connected to said secondary microphone whereby said driver unit may be operated selectively by the primary microphone on said body in exclusion of the secondary microphone and from a remote point by the secondary microphone in exclusion of the primary microphone.

References Cited in the file of this patent

UNITED STATES PATENTS

| | | |
|---|---|---|
| 1,272,641 | Egerton | July 16, 1918 |
| 1,293,060 | Edwards | Feb. 4, 1919 |
| 2,218,389 | Warmbier | Oct. 15, 1940 |
| 2,301,459 | Sanial | Nov. 10, 1942 |
| 2,314,108 | Silverman | Mar. 16, 1943 |
| 2,692,913 | Shitetsu Kaminori | Oct. 26, 1954 |
| 2,808,458 | Turpin et al, | Oct. 1, 1957 |